(12) United States Patent
Kumar et al.

(10) Patent No.: US 9,729,331 B2
(45) Date of Patent: Aug. 8, 2017

(54) CORRUPTING A HASH VALUE CORRESPONDING TO A KEY BASED ON A REVOCATION OF THE KEY

(71) Applicant: CRYPTOGRAPHY RESEARCH, INC., San Francisco, CA (US)

(72) Inventors: Ambuj Kumar, Sunnyvale, CA (US); Benjamin Che-Ming Jun, Burlingame, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 0 days.

(21) Appl. No.: 14/687,840

(22) Filed: Apr. 15, 2015

(65) Prior Publication Data

US 2015/0312046 A1     Oct. 29, 2015

Related U.S. Application Data

(60) Provisional application No. 61/983,418, filed on Apr. 23, 2014, provisional application No. 62/023,363, filed on Jul. 11, 2014.

(51) Int. Cl.
| | |
|---|---|
| *H04L 29/06* | (2006.01) |
| *H04L 9/32* | (2006.01) |
| *G06F 3/06* | (2006.01) |
| *H04L 9/08* | (2006.01) |

(52) U.S. Cl.
CPC .......... *H04L 9/3268* (2013.01); *G06F 3/0619* (2013.01); *G06F 3/0655* (2013.01); *G06F 3/0679* (2013.01); *H04L 9/0891* (2013.01); *H04L 63/0823* (2013.01)

(58) Field of Classification Search
CPC . H04L 9/3268; H04L 9/0891; H04L 63/0823; G06F 3/0619; G06F 3/0679; G06F 3/0655
USPC ......................................................... 713/158
See application file for complete search history.

(56) References Cited

U.S. PATENT DOCUMENTS

| | | | |
|---|---|---|---|
| 7,039,764 B1 * | 5/2006 | Shetty | G06F 17/30949 707/E17.036 |
| 2005/0204098 A1 * | 9/2005 | Martin | G06F 12/0833 711/130 |
| 2008/0222428 A1 | 9/2008 | Dellow | |
| 2012/0066515 A1 * | 3/2012 | Kasuya | H04L 9/3242 713/189 |
| 2015/0082048 A1 * | 3/2015 | Ferguson | G06F 21/602 713/189 |
| 2015/0278208 A1 * | 10/2015 | Foong | G06F 17/3033 707/747 |

* cited by examiner

*Primary Examiner* — Mohammad W Reza
(74) *Attorney, Agent, or Firm* — Lowenstein Sandler LLP

(57) ABSTRACT

A request associated with a revocation of a key may be received. A hash value corresponding to the key that is stored in a memory may be identified. Furthermore, the hash value that is stored in the memory may be corrupted in response to the request associated with the revocation of the key.

19 Claims, 11 Drawing Sheets

| Hash Value 1 |
|---|
| 401 |
| 402 |
| 403 |
| 404 |
| 405 |
| 406 |
| 407 |
| 408 |
| 409 |

FIG. 4A

| Hash Value 1 |
|---|
| Hash Value 2 |
| |
| |
| |
| |
| |
| |

FIG. 4B

| ~~Hash Value 1~~ |
|---|
| ~~Hash Value 2~~ |
| Hash Value 3 |
| |
| |
| |
| |

| 00101010 | | | | | | | |

| 11111111 | 00110001 | | | | | | |

| 11111111 | 11111111 | 110111000 | | | | | |

FIG. 7C

| 901 | 902 |
|---|---|
| 00101011 | 0100 |
| 01100011 | 0100 |
|  |  |
|  |  |
|  |  |
|  |  |
|  |  |
|  |  |
|  |  |

| 911 | 912 |
|---|---|
| 00101011 | 0100 |
| 11110011 | 0100 |
|  |  |
|  |  |
|  |  |
|  |  |
|  |  |
|  |  |
|  |  |

CORRUPTING A HASH VALUE CORRESPONDING TO A KEY BASED ON A REVOCATION OF THE KEY

RELATED APPLICATIONS

This application claims the benefit under 35 U.S.C. §119 (e) of U.S. Provisional Application 62/023,363 filed on Jul. 11, 2014 and U.S. Provisional Application No. 61/983,418 filed on Apr. 23, 2014, which are hereby incorporated by reference.

BRIEF DESCRIPTION OF THE DRAWINGS

The present disclosure will be understood more fully from the detailed description given below and from the accompanying drawings of various implementations of the disclosure.

FIG. 4A is an example one time programmable (OTP) memory in accordance with some embodiments of the disclosure.

FIG. 4B is an example one time programmable (OTP) memory with a corrupted first hash value in accordance with some embodiments of the disclosure.

FIG. 4C is an example one time programmable (OTP) memory with a corrupted first hash value and a corrupted second hash value in accordance with some embodiments of the disclosure.

FIG. 7A illustrates an example OTP memory and bits corresponding to a first hash value associated with a first key in accordance with some embodiments of the disclosure.

FIG. 7B illustrates an example OTP memory and bits of the OTP memory corresponding to the first hash value after a corruption of the first hash value in accordance with some embodiments of the disclosure.

FIG. 7C illustrates an example OTP memory and bits of the OTP memory corresponding to the first hash value and a second hash value after a corruption of the first and second hash values in accordance with some embodiments of the disclosure.

FIG. 9A illustrates an example OTP memory storing a hash value and an integrity check value in accordance with some embodiments of the disclosure.

FIG. 9B illustrates an example OTP memory storing a corrupted hash value and a corresponding integrity check value in accordance with some embodiments of the disclosure.

DETAILED DESCRIPTION

Figure 1:
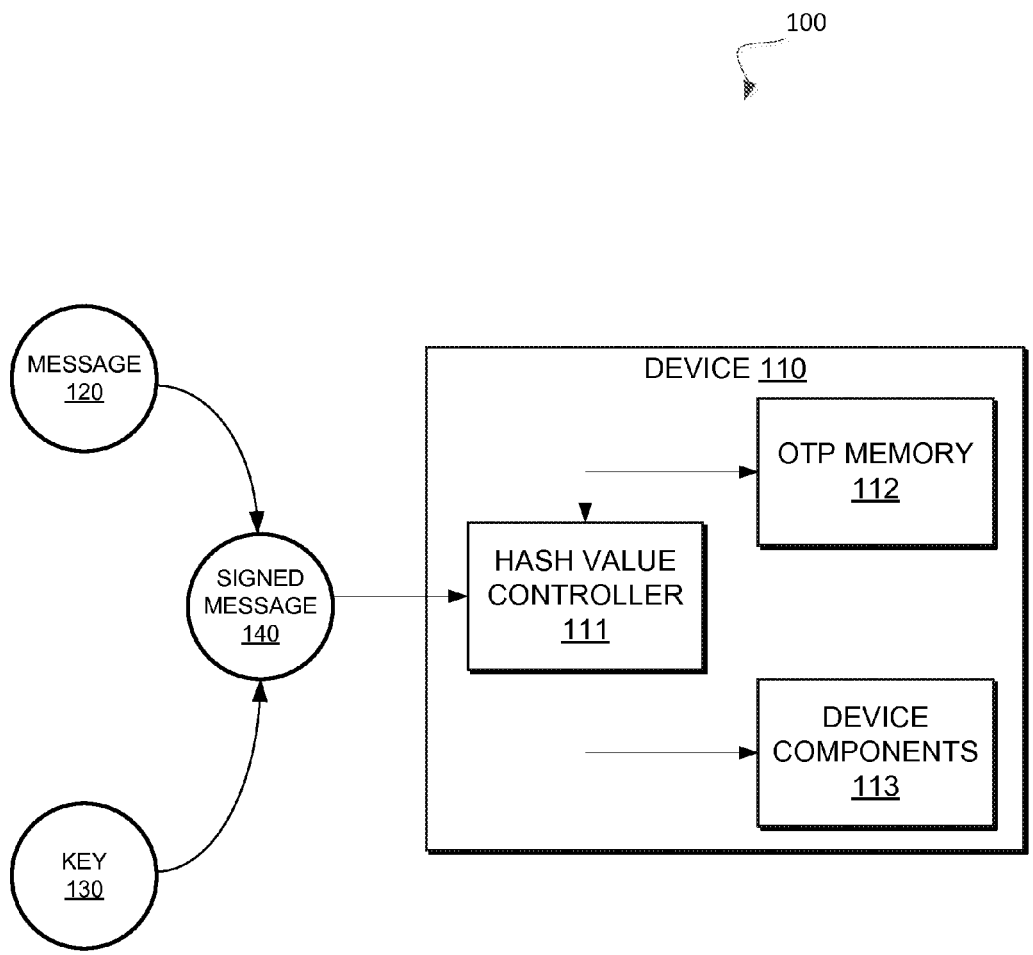
FIG. 1 illustrates an example environment to corrupt a hash value corresponding to a key based on a revocation of the key in accordance with some embodiments.

Aspects of the present disclosure are directed to corrupting a hash value corresponding to a key based on a revocation of the key. A key may refer to a piece of information that may be used to authenticate a message that is received by a device. Furthermore, a message may refer to an operation associated with the use or control of the device. A device may receive a message and may authenticate the message based on the key. In some embodiments, the message may be received with a key and such a combination of the message and the key may be referred to as a signed message. Accordingly, a device may receive a signed message corresponding to an operation associated with the device and may authenticate the signed message by comparing the key that is included in the signed message with a key that is stored in a memory of the device. For example, if the key that is included in the signed message matches the key that is stored in the device, then the message may be considered authenticated and the operation associated with the message may subsequently be executed or implemented by the device.

The device may be used in applications involving sensitive data or operations. For example, the device may be used to perform authentication services, authorize access to digital content, and so forth. A message corresponding to the implementation of sensitive operations or to the access of sensitive data may thus be authenticated by using the key in order to ensure that the operation of the device by the message is appropriate. Furthermore portions of the functionality of the device may be selectively enabled based on the authentication of the message. Thus, the key may be used to secure aspects of the device such as which entities (e.g., a transmitter of the message) may implement certain operations or access certain functionality of the device.

As previously described, the key from a signed message may be compared against a key stored in a memory of the device. For example, the memory may be a one-time programmable (OTP) memory. In general, OTP memory may be a type of digital memory where the setting of each bit of the OTP memory is locked by a fuse (e.g., an electrical fuse associated with a low resistance and designed to permanently break an electrically conductive path after the programming or setting of a corresponding bit) or an antifuse (e.g., an electrical component associated with an initial high resistance and designed to permanently create an electrically conductive path after the programming or setting of a corresponding bit). As an example, each bit of the OTP memory may start with an initial value of '0' and may be programmed or set to a later value of '1' (or vice versa). Thus, in order to program or set a key with a value of '10001' into the OTP memory, two bits of the OTP memory may be programmed from the initial value of '0' to the later value of '1.' Once the two bits of the OTP memory have been programmed to the later value of '1', then the two bits may not be programmed back to the value of '0.'

The OTP memory may be more expensive and have less capacity than other types of memory (e.g., memory that does not use fuses or antifuses) or storage (e.g., flash or harddrive). Thus, a device that uses an OTP memory may be limited in the memory capacity that may be used to store keys. Accordingly, instead of storing an entire key in the OTP memory, a hash value corresponding to the key may be stored in the OTP memory. A hash value may refer to the output of a hash algorithm or function that maps data of a first length (e.g., the key) to data of a second length (e.g., the hash value of the key). For example, a key may include 2048 bits while a hash value of the key may include 256 bits. A key may be received in a signed message and a hash value of the key may be computed and compared against a hash value stored in the OTP memory. If the computed hash value of the key from the message matches the hash value stored in the OTP memory, then the key of the signed message may be accepted and the signed message may be authenticated and the operation associated with the message may be executed. Thus, the storing of the hash value as opposed to the key in the OTP memory may allow for the storing of more information (e.g., more hash values as opposed to an equivalent number of keys).

Different hash values corresponding to different keys may be programmed into the same OTP memory by different entities. For example, a first entity may manufacture the OTP memory or a circuit that includes the OTP memory. The first entity may program a first key hash value into the OTP memory to be used to authenticate signed messages received by the circuit (e.g., a mobile chipset). At a later time, a second entity may utilize the circuit that includes the OTP memory in a device that incorporates the circuit (e.g., a cellular phone) and the second entity may program a second key hash value into the OTP memory. Further, a third entity may provide a service associated with the device (e.g., a cellular service used by the cellular phone) and may also program a third key hash value into the OTP memory.

Each of the entities may seek to deactivate or revoke the keys corresponding to hash values programmed by previous entities. For example, the second entity may seek to ensure that authentication of messages for the device are only authenticated based on the second key and that the first key programmed by the first entity may no longer be used to authenticate messages for the device. Accordingly, the disabling of the first hash value corresponding to the first key may result in the first key no longer capable of successfully authenticating a message. For example, a first hash value that is stored in the OTP and that corresponds to the first key may be corrupted. The corrupting of the first hash value may result in the programming of previously un-programmed bits of the OTP memory that are assigned to the first hash value. As an example, the first hash value may have a value of '00110001100' where each '0' value corresponds to a bit of the OTP memory assigned to the first hash value that has not yet been programmed. The corrupting of the first hash value may involve the programming of each of the bits that have not yet been programmed (e.g., the bits at a value of '0') to a value of '1.' Thus, the corrupting of the first hash value may be to change the first hash value from a value of '00110001100' to a value of '11111111111.' Accordingly, when the first key is subsequently received from a signed message and a hash value is computed for the first key, the computed hash value for the first key may no longer match the first hash value stored in the OTP memory (e.g., the computed hash value of the key is still '00110001100' while the stored first hash value that has been corrupted is '11111111111').

FIG. 1 illustrates an example environment 100 to corrupt a hash value corresponding to a key based on a revocation of the key. In general, the example environment 100 illustrates the corrupting of a hash value stored in an OTP memory in response to a request to revoke a key that corresponds to the hash value stored in the OTP memory.

As shown in FIG. 1, the example environment 100 illustrates a device 110. In some embodiments, the device 110 may include a hash value controller 111, an OTP memory 112, and various device components 113. The hash value controller 111 may receive a signed message 140 that is a combination of a message 120 and a key 130. The message 120 may be for the device 110 to perform a particular operation or to selectively enable functionality of the device 110. Examples of such operations may include, but are not limited to, controls associated with the device, programming of the OTP memory 112, regulating of access to diagnostic and debugging functionality associated with the device 110, authentication of the device 110, authorization of access to digital content, enabling of particular functionality of the device components 113, Joint Test Action Group (JTAG) scans, and so forth. In some embodiments, the message 120 may be from a component of the device components 113, a network control server, an embedded microprocessor (e.g., from device components 113), or from a manufacturing server. The key 130 may be received by the device 110 from the same source that has transmitted the message 120. Alternatively, the key 130 may be received from a separate source. For example, a first source (e.g., the manufacturing server) may transmit a message to the device 110 and a second source (e.g., a key repository from another entity) may transmit a key to the device 110. Furthermore, the key may be a public key (e.g., a key that is provided to or assigned to multiple entities) or a private key (e.g., a key that is provided to or assigned to a single entity).

The hash value controller 111 of the device 110 may receive the signed message 140. In some embodiments, the hash value controller 111 may compute a hash value for the key 130 that is included in the signed message 140 and may compare the computed hash value with a hash value that is stored in the OTP memory 112. If the computed hash value for the received key 130 matches the stored hash value, then the message 120 may be verified as authentic and the device 110 may be allowed to execute or accept the message 120. As is described in further detail below, the hash value controller 111 may further receive a signed message to corrupt a hash value that is stored in the OTP memory 112. Accordingly, the hash value controller 111 may corrupt hash values stored in the OTP memory 112 in response to a request to revoke a key.

Figure 2:
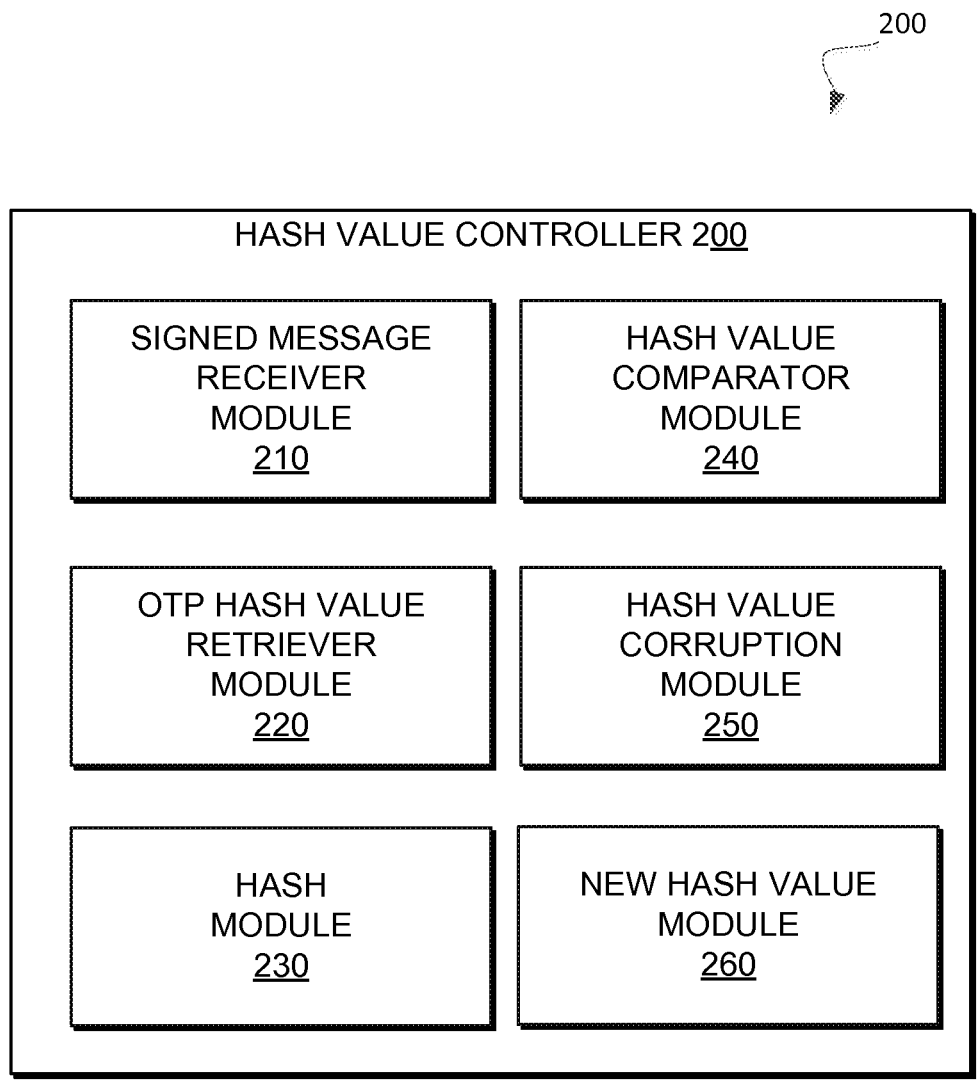
FIG. 2 is a block diagram of an example hash value controller in accordance with some embodiments of the present disclosure.

FIG. 2 is a block diagram of an example hash value controller 200. In general, the hash value controller 200 may correspond to the hash value controller 111 of FIG. 1. The hash value controller 200 may be used in a device (e.g., device 110) to compare a computed hash value for a key associated with a signed message to a hash value stored in an OTP memory (e.g., OTP memory 112) and to corrupt hash values stored in the OTP memory in response to a request to revoke a key. The hash value controller 200 may include a signed message receiver module 210, an OTP hash value retriever module 220, a hash module 230, a hash value comparator module 240, a hash value corruption module 250, and a new hash value module 260. In alternative embodiments, the functionality of one or more of the modules may be combined or divided.

As shown in FIG. 2, the hash value controller 200 may include a signed message receiver module 210 that may receive a signed message that includes a key and a message. For example, the key and the message may be received in a single transmission from a single source (e.g., a particular server) or the key and the message may be separately received from transmissions from different sources (e.g., the key is received from a first server and the message is received from a second server). The message may specify control operations for a device.

The OTP hash value retriever module 220 may retrieve data from an OTP memory. For example, in response to receiving the signed message, a hash value may be retrieved or received from the OTP memory. The hash module 230 may compute a hash value for the key that is included in the signed message. For example, the hash module 230 may perform a hash function on the key. In some embodiments, the hash function may be one of Secure Hash Algorithms (e.g., SHA or SHA-2 or SHA-3). The hash function may be used to receive a key that is 2048 bits in size and may map the key to a hash value of 256 bits.

The hash value comparator module 240 may compare the computed hash value for the key included in the signed message with the hash value that has been retrieved from the OTP memory. In some embodiments, if the computed hash value matches the stored hash value from the OTP memory (e.g., the computed hash value is identical to the stored hash value), then the signed message may be considered to be authenticated or verified and the message included in the signed message may be accepted (e.g., transmitted to other portions of a device to be operated upon). However, if the computed hash value does not match the stored hash value from the OTP memory (e.g., the computed hash value is not identical to the stored hash value), then the signed message may not be considered to be authenticated or verified and the message that is included in the signed message may not be accepted. Accordingly, a signed message with a key that is associated with a computed hash value that matches a stored hash value may result in the acceptance and subsequent execution of the message included in the signed message while a signed message with a key that is associated with a computed hash value that does not match the stored hash value may not result in the acceptance and subsequent execution of the message.

Referring to FIG. 2, the hash value corruption module 250 may corrupt one or more hash values stored in the OTP memory. For example, a signed message corresponding to a request to revoke a key or an indication that a key has been revoked may be received. In response to the request to revoke the key, a hash valued stored in the OTP memory that corresponds to the revoked key may be corrupted. For example, the OTP memory may store a first hash value that corresponds to a first key and a second hash value that corresponds to a second key. A request to revoke the first key may be received. In response to the request, the first hash value may be corrupted while the second hash value is not corrupted. The corrupting of the first hash value may be accomplished by programming one or more bits of the OTP memory that corresponds to the first hash value. For example, all (or some) of the bits of the first hash value may be programmed so that each bit is associated with a value of '1' (or a value of '0'). Further details with regard to the corrupting of a hash value are described in additional detail below.

The new hash value module 260 may store a new hash value in the OTP memory. For example, a signed message may be received to create a new hash value to be stored in the OTP memory in response to the provisioning of a new key. Subsequently, the new key may be received in a later signed message, a hash value may be computed for the new key, and the computed hash value for the new key may then match the new hash value that is stored in the OTP memory.

Figure 3A:
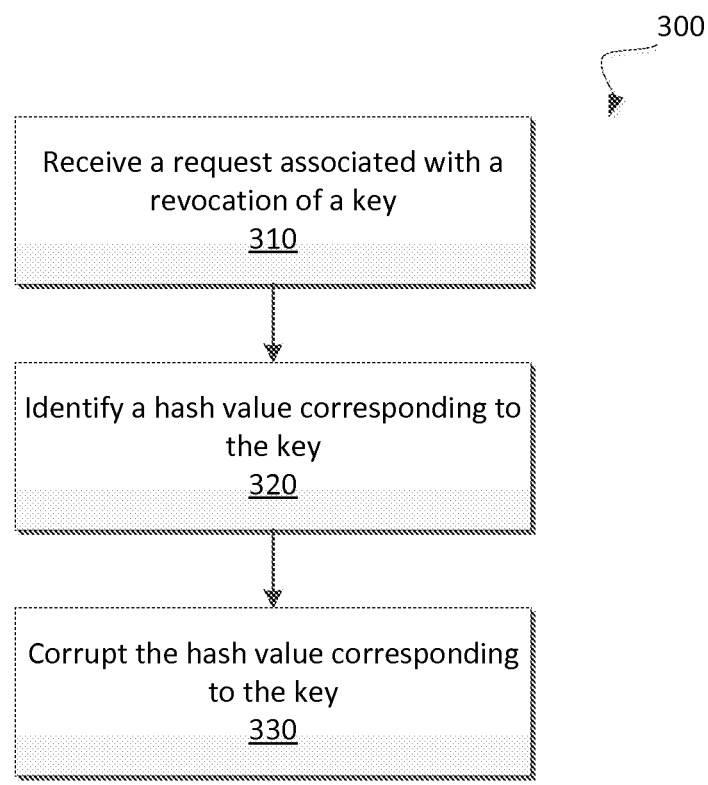
FIG. 3A is a flow diagram of an example method to corrupt a hash value in accordance with some embodiments.

FIG. 3A is a flow diagram of an example method 300 to corrupt a hash value. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by hash value controller 111 of FIG. 1 or the hash value controller 200 of FIG. 2.

As shown in FIG. 3A, the method 300 may begin with the processing logic receiving a request associated with a revocation of a key (block 310). In some embodiments, the revocation of a key may refer to the disabling of a key so that the key may no longer be used to successfully authenticate a signed message. The request associated with the revocation of a key may be a signed message. For example, a signed message may be received that includes a key and a message to revoke the key after it has been used to authenticate the message. The processing logic may further identify a hash value corresponding to the key (block 320). For example, a hash value that is stored in an OTP memory and that corresponds to a computed hash value of the key may be identified. Additionally, the processing logic may corrupt the hash value corresponding to the key associated with the revocation request. For example, the bits of the OTP memory that are used to store the hash value may be corrupted by programming one or more bits used to store the hash value and that have not yet been programmed to a particular value.

Figure 3B:
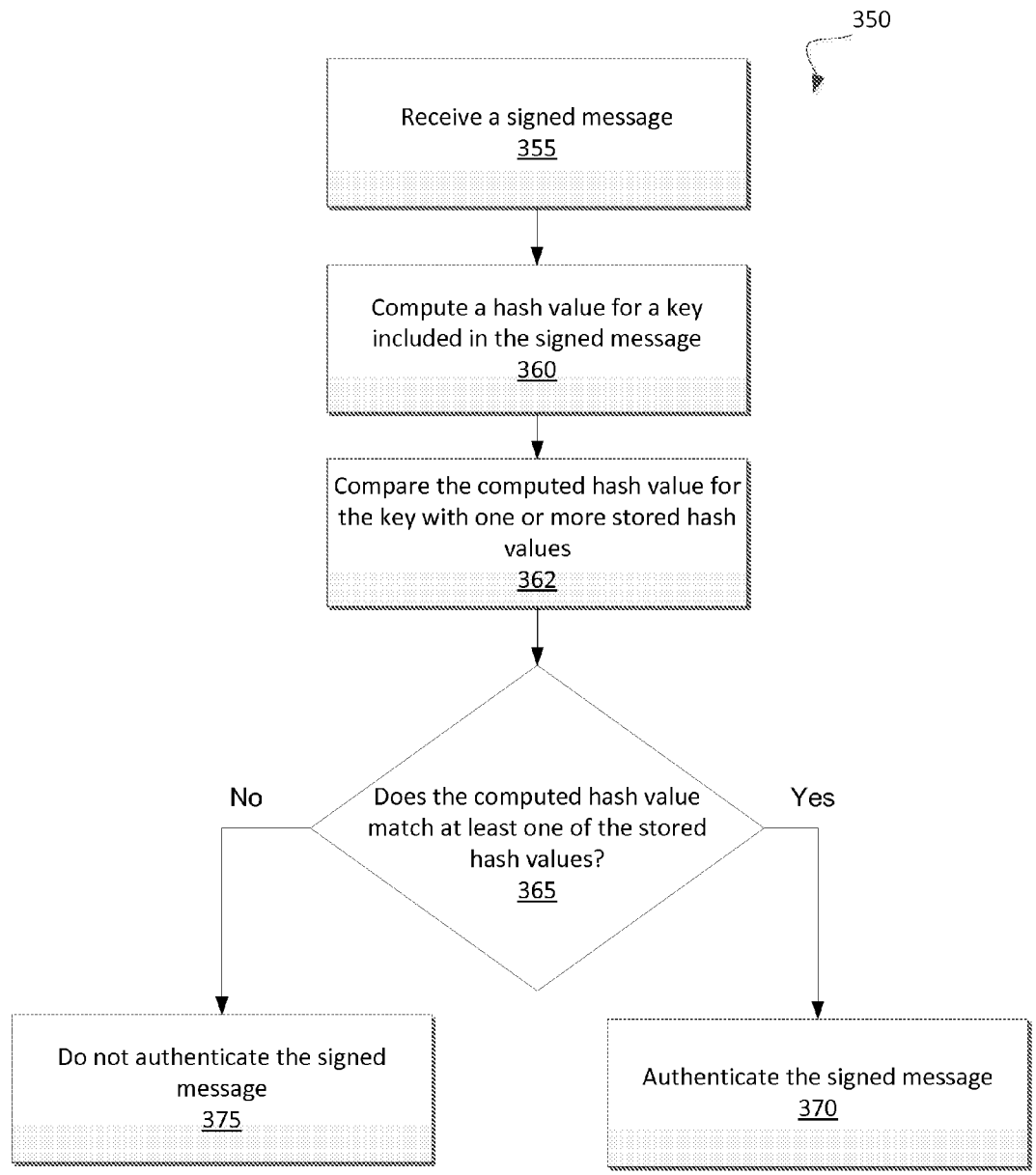
FIG. 3B is a flow diagram of an example method to use a hash value stored in an OTP memory in accordance with some embodiments of the disclosure.

FIG. 3B is a flow diagram of an example method 350 to use a hash value stored in an OTP memory. In general, the method 350 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 350 may be performed by hash value controller 111 of FIG. 1 or the hash value controller 200 of FIG. 2.

As shown in FIG. 3B, the method 350 may begin with the processing logic receiving a signed message (block 355). In some embodiments, the signed message may include a key and a message. The processing logic may compute a hash value of the key that is included in the signed message (block 360). For example, a hash function may be performed on the key. The processing logic may compare the computed hash value of the key received from the signed message with one or more hash values stored in an OTP memory (block 362). Furthermore, the processing logic may determine if the computed hash value matches at least one of the stored hash values based on the comparison of the computed hash value and one or more hash values stored in the OTP memory (block 365). If the computed hash value of the key matches at least one of the hash values stored in the OTP memory, then the signed message may be authenticated and the message may be executed (block 370). However, if the computed hash value of the key does not match any of the hash values stored in the OTP memory, then the signed message may not be authenticated and the message may not be executed (block 375). In some embodiments, the computed hash value of the key may not match any of the hash values stored in the OTP memory if a previous hash value stored in the OTP memory that corresponds to the key was corrupted. For example, at a first time, a computed hash value for a first key may be '0010' and the bits '0010' may be stored as a first hash value in the OTP memory. At a second time subsequent to the first time, a request to revoke the first key may be received. In response to the request, the first hash value in the OTP memory may be corrupted by changing the bits from '0010' to '1111' (e.g., all bits that were previously not programmed to a value of '1' will be programmed). At a next time after the corruption of the first hash value, the first key may be received in a signed message and the computed hash value for the first key may again be '0010'. However, since the first hash value stored in the OTP memory has been changed from '0010' to '1111,' the computed hash value for the first key may no longer match the first hash value stored in the OTP memory. Thus, a computed hash value for a revoked key may no longer successfully match with a hash value after it has been corrupted.

FIG. 4A is an example one time programmable (OTP) memory 400. In general, the OTP memory 400 may store one or more hash values corresponding to one or more keys. Furthermore, the OTP memory 400 may correspond to the OTP memory 112 of FIG. 1.

As shown in FIG. 4A, the OTP memory 400 may store a first hash value. For example, the OTP memory 400 may be configured to store multiple hash values in different fields 401-409. For example, the first hash value may be stored in a first field 401 of the OTP memory 400. Additional fields 402-409 may be able to store additional hash values. Although not shown, the OTP memory 400 may be used to store multiple hash values at the same time. For example, the first hash value may be stored in the first field 401 and a second hash value may be stored in an additional field 402.

FIG. 4B is an example one time programmable (OTP) memory 410 with a corrupted first hash value. In general, the OTP memory 410 may store a corrupted first hash value corresponding to a revoked key and a second hash value corresponding to a key that has not been revoked. Furthermore, the OTP memory 410 may correspond to the OTP memory 400 after corrupting the first hash value.

As shown in FIG. 4B, the OTP memory 410 may include a corrupted first hash value (e.g., a hash value corresponding to the first field 401) and a second hash value (e.g., a hash value written to the additional field 402). In some embodiments, the first hash value may be corrupted in response to a request to revoke a key. For example, as previously described, the OTP memory may be used by different manufacturers at different times. A first manufacturer of the OTP memory may have programmed the first hash value into the OTP memory. A second manufacturer may use the OTP memory in a device and may thus program the second hash value into the OTP memory and may further request a revocation of the first key. Accordingly, the first hash value of the OTP memory 410 may be corrupted and the second hash value may be programmed into the OTP memory 410.

FIG. 4C is an example one time programmable (OTP) memory 420 with a corrupted first hash value and a corrupted second hash value. In general, the OTP memory 420 may store a corrupted first hash value and a corrupted second hash value corresponding to a first revoked key and a second revoked key and a third hash value corresponding to a new key. Furthermore, the OTP memory 420 may correspond to the OTP memory 410 after corrupting the second hash value.

As shown in FIG. 4C, the OTP memory 420 may store a corrupted first hash value and a corrupted second hash value. For example, a third manufacturer or entity may obtain the OTP memory after the first and second manufacturer or entity. Accordingly, the third manufacturer or entity may revoke the second key associated with the second manufacturer or entity and may further program a new third hash value corresponding to a third key in the OTP memory 420. Thus, an OTP memory may be used to store one or more hash values corresponding to one or more keys. The stored hash values may be corrupted at different times and new hash values corresponding to new keys may be programmed into the OTP memory.

Figure 5:
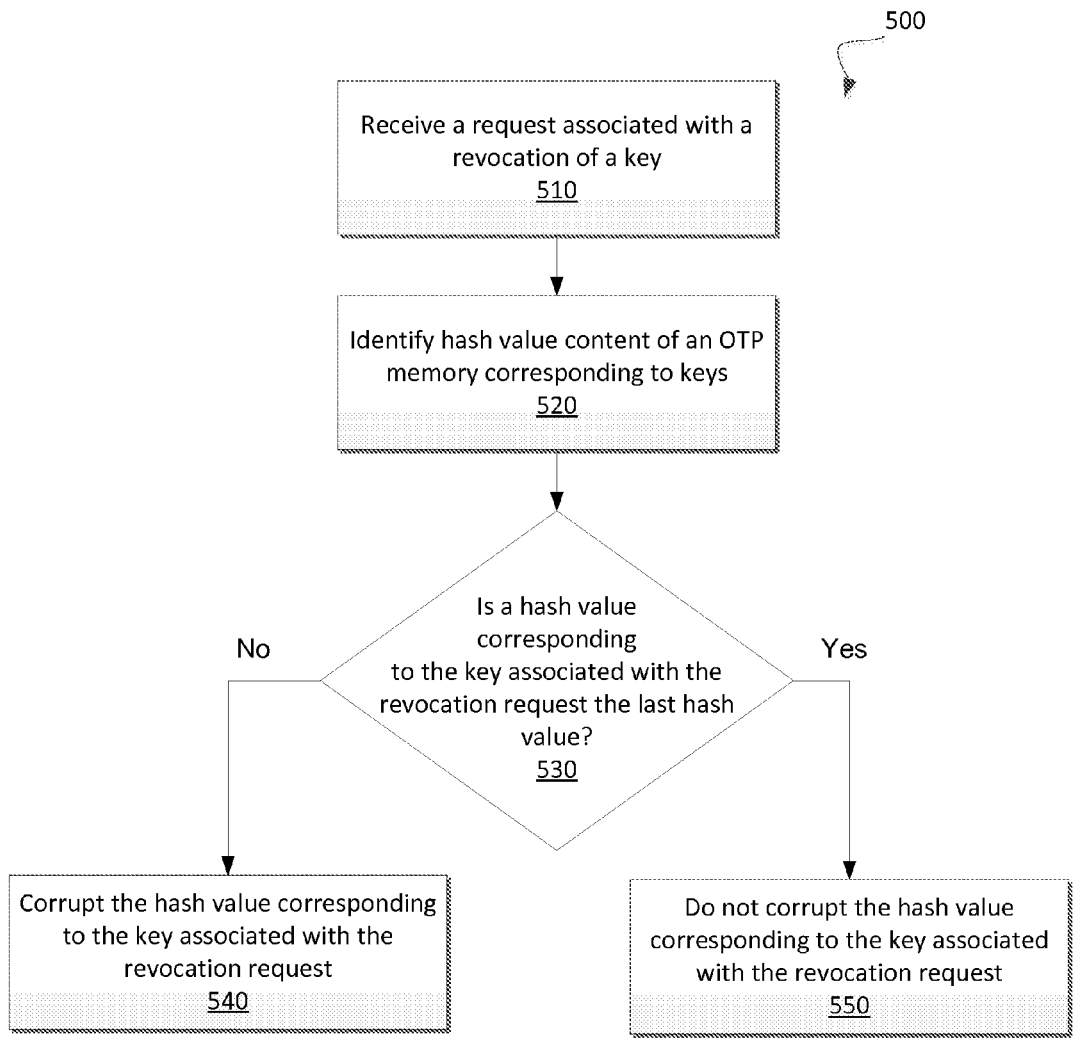
FIG. 5 is a flow diagram of an example method to corrupt a hash value or not to corrupt a hash value based on existing hash values in accordance with some embodiments.

FIG. 5 is a flow diagram of an example method 500 to corrupt a hash value or not to corrupt a hash value based on existing hash values. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by hash value controller 111 of FIG. 1 or the hash value controller 200 of FIG. 2.

As shown in FIG. 5, the method 500 may begin with the processing logic receiving a request associated with the revocation of a key (block 510). For example, a signed message specifying an operation to corrupt a hash value stored in an OTP memory may be received. The key of the signed message may be used to authenticate the signed message to perform the operation to corrupt the hash value. For example, a hash value of the key of the signed message may be computed and determined to match an existing hash value stored in the OTP memory. The processing logic may further identify the hash value content of the OTP memory that corresponds to keys (block 520). For example, portions of the OTP memory that are used to store hash values of keys may be received. Additionally, a determination may be made as to whether a hash value corresponding to the key associated with the revocation request is the last or only hash value stored in the OTP memory (block 530). For example, a request to revoke a first key may be received. The OTP memory may store a first hash value corresponding to the first key. In some embodiments, the OTP memory may or may not store a second hash value that corresponds to a second key. If the OTP memory does store a second hash value (e.g., the first hash value is not the only valid or non-corrupted hash value) then the hash value corresponding to the key associated with the revocation request may be corrupted (block 540). However, if the OTP memory does not store a second hash value (e.g., the first hash value is the only valid or non-corrupted hash value), then the hash value corresponding to the key associated with the revocation request may not be corrupted (block 550). Accordingly, a hash value stored in an OTP memory may be corrupted in response to a request to revoke a key and a determination that the OTP memory stores at least one other hash value that has not been previously corrupted. Thus, the last or only hash value that has not yet been corrupted and is stored in an OTP memory may not be corrupted until at least a new hash value has been stored in the OTP memory.

Figure 6:
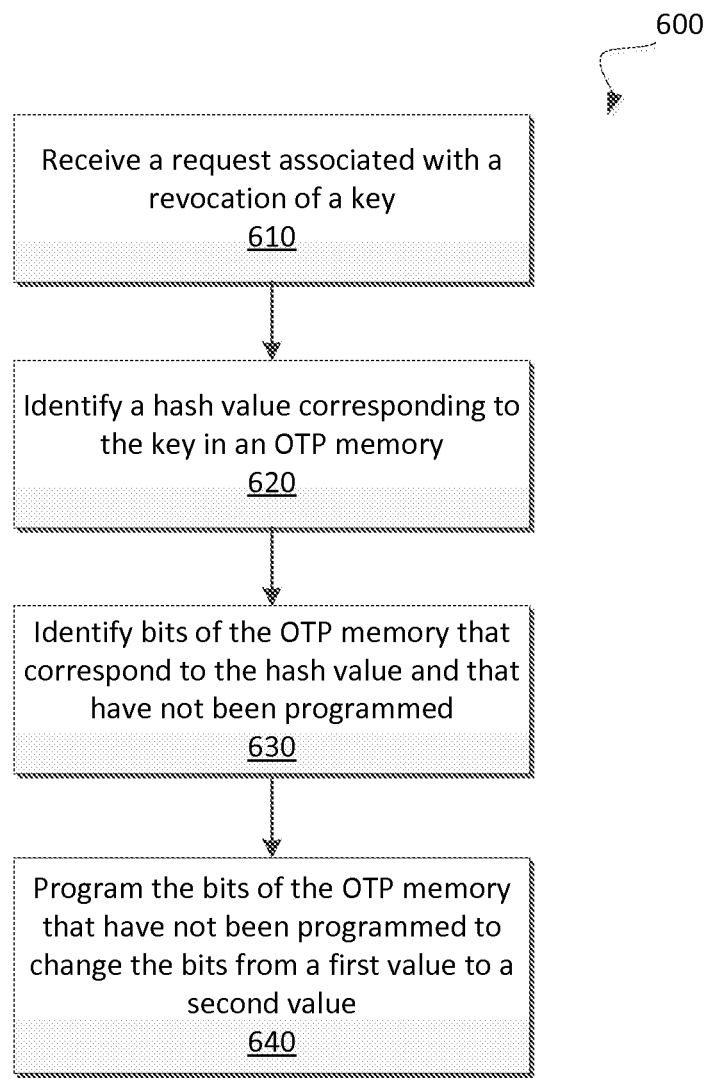
FIG. 6 is a flow diagram of an example method to program bits of an OTP memory to corrupt a hash value stored in the OTP memory in accordance with some embodiments.

FIG. 6 is a flow diagram of an example method 600 to program bits of an OTP memory to corrupt a hash value stored in the OTP memory. In general, the method 600 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 600 may be performed by hash value controller 111 of FIG. 1 or the hash value controller 200 of FIG. 2.

As shown in FIG. 6, the method 600 may begin with the processing logic receiving a request associated with the revocation of a key (block 610). For example, a request that a key should no longer be valid to authenticate signed messages may be received. The processing logic may subsequently identify a hash value stored in the OTP memory and that corresponds to the key (block 620). For example, multiple bits used by the OTP memory to store the hash value may be identified. Furthermore, the bits of the OTP memory that correspond to the hash value that have not yet been programmed may be identified (block 630). In some embodiments, a hash value may include bit values of '0' and '1.' A bit of the OTP memory that has not yet been programmed may correspond to a value of '0' and a bit of the OTP memory that has been programmed may correspond to a value of '1.' For example, the OTP memory may utilize a fuse for each bit of the OTP memory where the programming of a bit to a value of '1' includes the permanent breaking of an electrically conductive path by applying a current that exceeds a threshold level across a fuse corresponding to the bit. Additionally, a bit with a value of '0' may include a fuse that has not been broken.

Thus, a hash value may correspond to bits of an OTP memory that have been programmed as well as bits of the OTP memory that have not yet been programmed. For example, a hash value may be at a value of '0001100' where the first three bits of the OTP memory are not programmed, the next two bits of the OTP memory are programmed, and the next two bits of the OTP memory are not programmed. The processing logic may further program the bits of the OTP memory that have not yet been programmed to change the bits from a first value to a second value (block 640). For example, the bits of the OTP memory that are assigned to the hash value and that correspond to the value of '0' may be programmed to later correspond to the value of '1' in response to the request to revoke the key that corresponds to the hash value.

In alternative embodiments, a bit of the OTP memory that has not yet been programmed may correspond to a value of '1' and a bit of the OTP memory that has been programmed may correspond to a value of '0.' For example, the OTP memory may utilize an antifuse for each bit of the OTP memory where the programming of a bit includes the permanent creation of an electrically conductive path by applying a voltage across the antifuse that exceeds a threshold voltage level. In such an embodiment, the bits of the OTP memory that are assigned to the hash value and that correspond to a value of '1' may be programmed to later correspond to the value of '0' in response to the request to revoke the key.

FIG. 7A illustrates an example OTP memory 700 and bits corresponding to a first hash value associated with a first key. In general, the OTP memory 700 may store one or more hash values corresponding to one or more keys. Furthermore, the OTP memory 700 may correspond to the OTP memory 112 of FIG. 1.

As shown in FIG. 7A, the OTP memory 700 may store a first hash value including bits '00101010.' For example, the first hash value may be equivalent to a hash function output of a first key. Although not shown, the OTP memory 700 may further include additional hash values corresponding to additional keys.

FIG. 7B illustrates an example OTP memory 710 and bits corresponding to the first hash value after a corruption of the first hash value. In general, the OTP memory 710 may correspond to the OTP memory 700 after the corrupting of the first hash value and the writing or storing of a new second hash value. The first hash value may be corrupted by programming bits of the OTP memory that correspond to the first hash value and that have not yet been programmed. For example, the bits of the OTP memory that are used to represent the first hash value and that are at a value of '0' may be configured or programmed to now be at a value of '1'. In some embodiments, each of the bits of the first hash value that have not yet been programmed may thus be programmed to corrupt the first hash value. Furthermore, a second hash value at a value of '00110001' may be programmed into the OTP memory.

FIG. 7C illustrates an example OTP memory 720 and bits corresponding to the first hash value and a second hash value after a corruption of the first and second hash values. In general, the OTP memory 720 may correspond to the OTP memory 710 after the corrupting of the first hash value and the second hash value. As shown, the first hash value remains corrupted (e.g., changed to a value of '11111111') and the second hash value has now been corrupted (i.e., changed) to a value of '11111111' as well by the programming of bits that were previously not programmed. Furthermore, a new third hash value may be programmed into the OTP memory. Accordingly, previously corrupted hash values remain corrupted (e.g., all bits programmed) and a new hash value includes programmed bits and bits that have not yet been programmed.

Although FIGS. 7A-7C illustrate the corrupting of hash values by the changing of multiple bits that correspond to a hash value, in some embodiments, a single bit of the hash value may be changed (e.g., by programming the single bit from a first value to a second value) in order to corrupt a hash value. Accordingly, at least one bit of a plurality of bits that correspond to a hash value may be programmed to corrupt the hash value.

Figure 8:
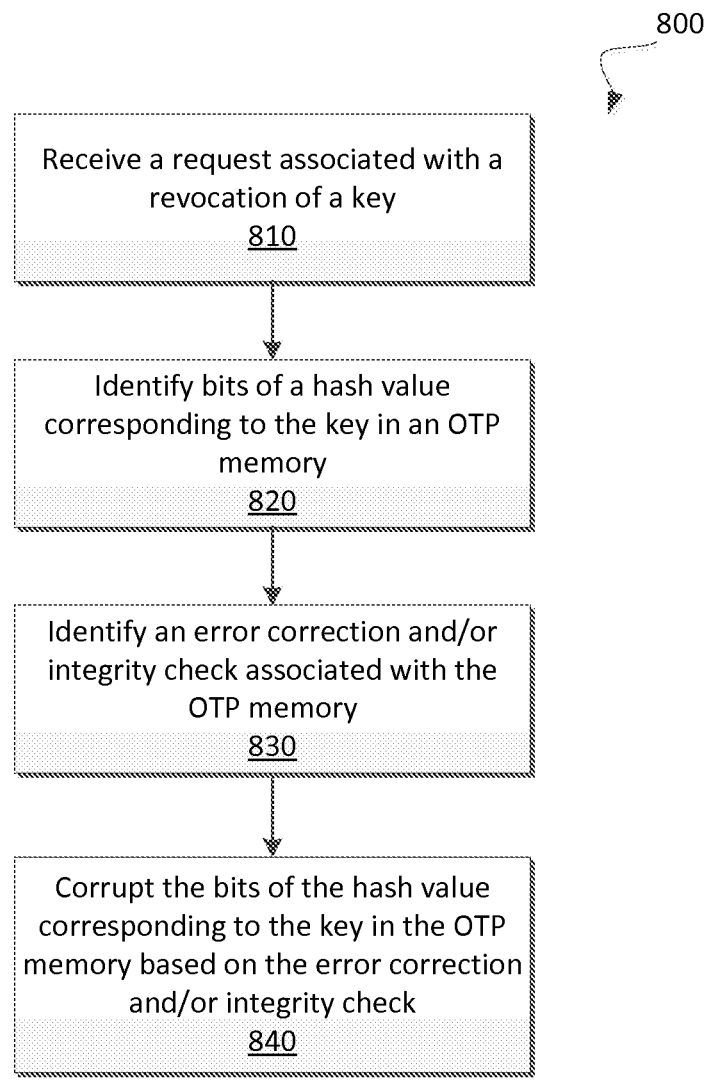
FIG. 8 is a flow diagram of an example method to corrupt bits of a hash value in an OTP memory based on error correction and an integrity check associated with the OTP memory in accordance with some embodiments.

FIG. 8 is a flow diagram of an example method 800 to corrupt one or more bits of a hash value in an OTP memory based on error correction and an integrity check associated with the OTP memory. In general, the method 800 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 800 may be performed by hash value controller 111 of FIG. 1 or the hash value controller 200 of FIG. 2.

As shown in FIG. 8, the method 800 may begin with the processing logic receiving a request associated with the revocation of a key (block 810). The processing logic may further identify bits of a hash value corresponding to the key in an OTP memory (block 820). Furthermore, the processing logic may identify an error correction and/or an integrity check associated with the OTP memory (block 830). Error correction and integrity check may be functions implemented by circuitry of the OTP memory. For example, error correction may be a technique used by the circuitry of the OTP memory to enable reliable reading of the bits of the OTP memory. In general, errors may be introduced to the transmission or reading of the bits of an OTP memory, thus resulting in a receiver (e.g., a circuit component retrieving a hash value stored in the OTP memory) retrieving a bit that corresponds to a first value (e.g., a '0') stored in the OTP memory, but incorrectly receiving the bit at a second value (e.g., a '1') due to noise or other such error introduced into the circuit. Error correction may result in the detecting of such an error and the reconstruction of the original data. For example, a hash value stored in an OTP memory may be at a value of '00110111" and a retrieval of the hash value with some introduced error may result in the hash value incorrectly being read as '10110111' where the first bit may incorrectly be read as a value of '1' instead of a value of '0' as intended to be stored in the OTP memory. The error correction techniques may identify that introduced noise has created such an error and may thus correct the error by ensuring that the value of the first bit as received is changed to a value of '0' instead of a value of '1.'

Furthermore, an integrity check may be used in conjunction with the OTP memory. For example, each hash value stored in the OTP memory may also be associated with an integrity check value that specifies a condition of a valid hash value. As an example, a first hash value may be at a value of '00101011' and a corresponding first integrity check value may be '0100' (corresponding to a value of four) to indicate a condition that a valid hash value (e.g., a hash value that has not been corrupted) should include four bits at a value of '0.' Accordingly, each hash value may be associated with a separate integrity check value that specifies a condition of the corresponding hash value. In order to corrupt a hash value, a number of bits of the hash value may be corrupted so that the hash value fails the integrity check. For example, in the above example, the first hash value may be corrupted by changing the first hash value from '00101011' to a value of '11101011', thus ensuring that the first hash value may not satisfy the condition of the integrity check of '0100' that specifies that a valid hash value has four bits at a value of '0.'

The processing logic may thus corrupt the bits of the hash value in the OTP memory corresponding to a revoked key based on the error correction technique and/or an integrity check technique used for the OTP memory (block 840). A number of bits of the hash value may be programmed so that the hash value will not satisfy the condition of the integrity check as well as any error correction of the circuit will not overcome the corruption of the bits of the hash value. For example, a hash value may correspond to 256 bits in an OTP memory. Some of the bits of the OTP memory that have not yet been programmed may be programmed in response to a request to revoke a key while additional bits that have not yet been programmed may remain as bits that have not yet been programmed. Accordingly, a first subset (or group) of the bits that have not yet been programmed may be corrupted while a second subset (or group) of the bits that have not yet been programmed may not be corrupted. Thus, not all of the bits of the hash value may be programmed in order to corrupt the hash value.

Figures 9A, 9B:
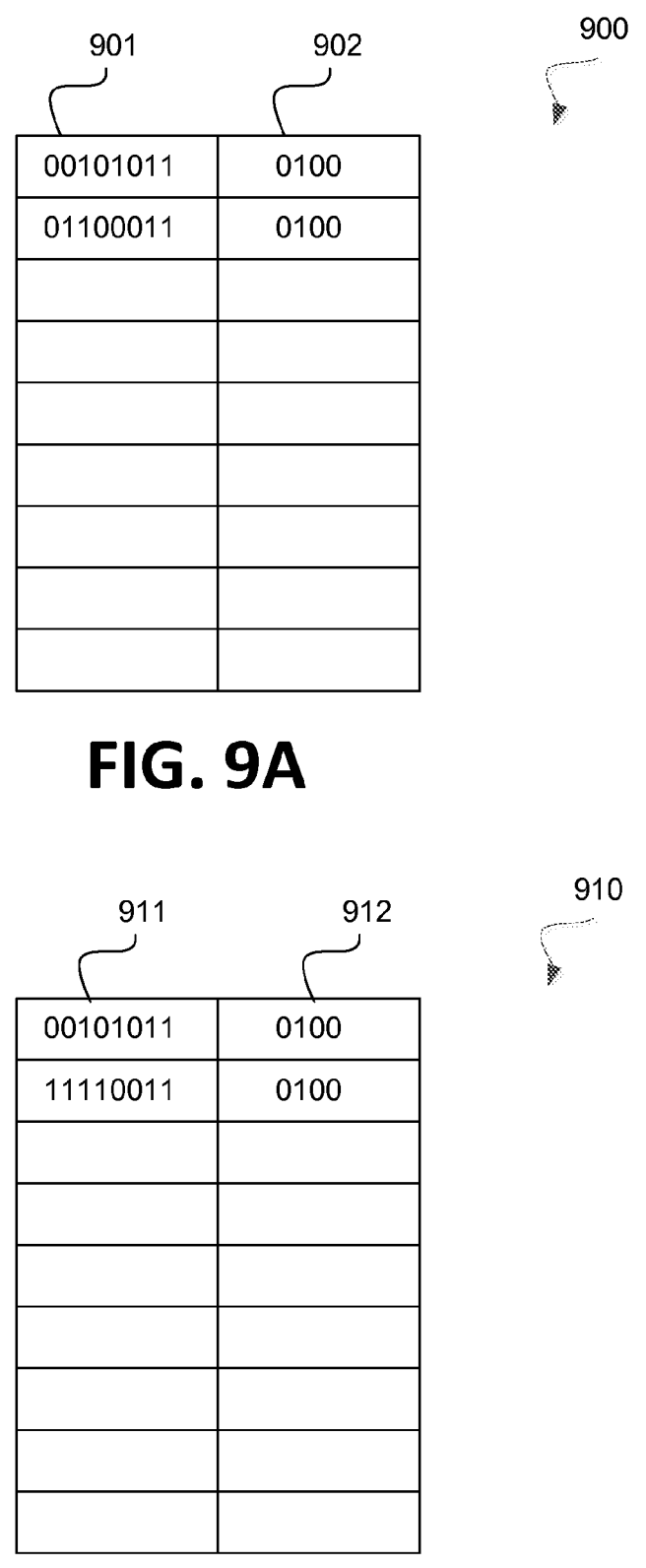

FIG. 9A illustrates an example OTP memory 900 storing a hash value and an integrity check value. In general, the OTP memory 900 may store one or more hash values in a hash value field 901 and one or more integrity check values in an integrity check value field 902 corresponding to the one or more hash values. Furthermore, the OTP memory 900 may correspond to the OTP memory 112 of FIG. 1.

As shown in FIG. 9A, the OTP memory 900 may store a first hash value including bits '00101011' with an associated integrity check value of '0100' that indicates a valid hash value including four zero bit values. The OTP memory 900 may further store a second hash value including bits '01100011' and an associated integrity check value of '0100' as well. Thus, the OTP memory 900 illustrates a first hash value and a second hash value that both satisfy the condition of each corresponding integrity check value. For example, in such a case, neither the first hash value nor the second hash value have been corrupted in response to a request to revoke a key.

FIG. 9B illustrates an example OTP memory 910 storing a corrupted second hash value and a corresponding integrity check value. In general, the OTP memory 910 may store one or more hash values in a hash value field 911 and one or more integrity check values in an integrity check value field 912 corresponding to the one or more hash values. Furthermore, the OTP memory 910 may correspond to the OTP memory 900 after the corrupting of the second hash value. As shown, the corrupting of the second hash value may change the bits of the second hash value from '01100011' to '11110011.' For example, two of the bits of second hash value that were not programmed may be programmed to corrupt the second hash value while two of the other bits that were not yet programmed may remain as not being programmed. Furthermore, the second integrity check value associated with the second hash value may remain at a value of '0100' that specifies that a valid second hash value includes four zero bits. However, since two of the bits of the second hash value that were previously not programmed are now programmed (e.g., changed from a value of '0' to a value of '1'), the second hash value may no longer satisfy the condition of the second integrity check value as the corrupted second hash value has two zero bits while the condition of the second integrity check value specifies that four zero bits must be in a valid hash value. Accordingly, the second hash value may be considered to be corrupted as it no longer satisfies the condition of the second integrity check value, thus making the second hash value not being used to authenticate a key that may be received in the future. For example, a particular hash value that does not satisfy an integrity check value may not be used to authenticate any messages.

Although the above examples illustrate an OTP memory storing a key and/or an integrity check value, additional information associated with a key may be stored in the OTP memory. For example, the OTP memory may further store privilege information (e.g., eligible operations of a device that are associated with the key) and identity information (e.g., an identification of an entity associated with the key) for one or more of the keys that are stored in the OTP memory.

Figure 10:
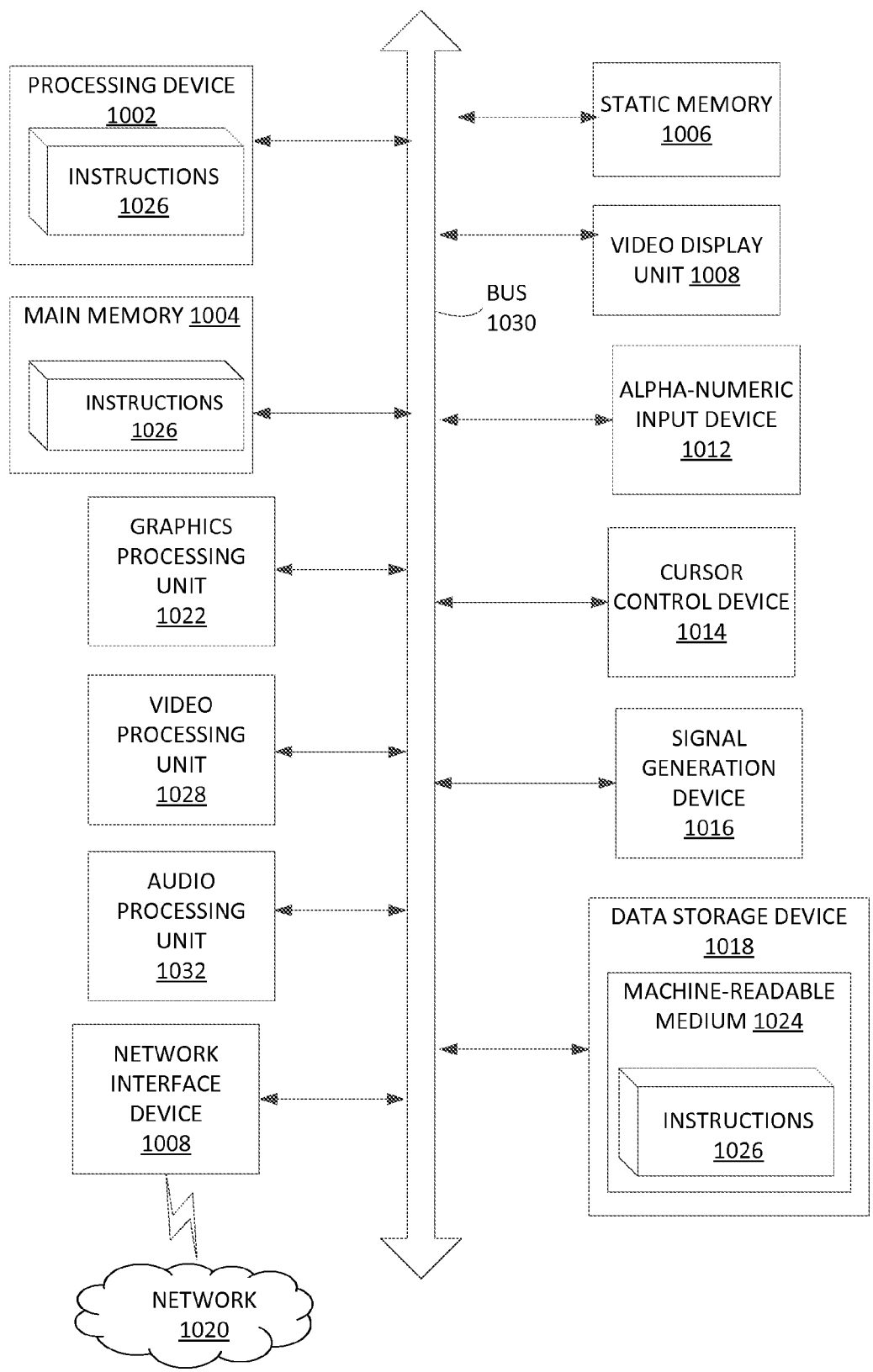
FIG. 10 illustrates a block diagram of an embodiment of a computer system in which some embodiments of the disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 1008. The computer system 1000 also may include a video display unit 1008 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to a hash value controller (e.g., hash value controller 200 of FIG. 2). While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a request associated with a revocation of a key;
   identifying a hash value corresponding to the key, the hash value being stored in a memory;
   identifying at least one bit of the memory that is assigned to the hash value and that has not been previously programmed; and corrupting, by a processing device, the hash value that is stored in the memory in response to the request associated with the revocation of the key by programming the at least one bit of the memory that has not been previously programmed.

2. The method of claim 1, wherein the memory is a one-time programmable (OTP) memory.

3. The method of claim 2, wherein the OTP memory comprises a plurality of fuses and wherein each fuse of the plurality of fuses corresponds to one of the plurality of bits associated with the hash value, wherein the programming of the at least one bit that has not been programmed results in a breaking of a corresponding fuse to change a value of the at least one bit from a first value to a second value.

4. The method of claim 1, further comprising:
determining if the hash value corresponding to the key is a last hash value stored in the memory that has not been corrupted, and wherein the corrupting of the hash value is further based on the determination that the hash value corresponding to the key is not the last hash value stored in the memory that has not been corrupted.

5. The method of claim 1, further comprising:
identifying an integrity check value associated with the hash value, wherein the corrupting of the hash value is further based on the identified integrity check value associated with the hash value.

6. The method of claim 5, further comprising:
identifying an error correction associated with the memory, wherein the corrupting of the hash value is further based on the error correction associated with the memory.

7. The method of claim 5, wherein the corrupting of the hash value based on the identified integrity check is performed by programming the at least one bit that has not been programmed in a plurality of bits corresponding to the hash value, wherein the hash value with the programmed at least one bit in the plurality of bits fails the integrity check using the integrity check value.

8. A system comprising:
a one-time programmable (OTP) memory to store a plurality of hash values, wherein each of the plurality of hash values corresponds to a different key; and
a hash value controller, comprising a processing device and coupled with the OTP memory, to:
receive a request associated with a disabling of a key;
identify a hash value of the plurality of hash values stored in the OTP memory that corresponds to the key;
identify at least one bit of the OTP memory that is assigned to the hash value and that has not been previously programmed; and
corrupt the hash value that corresponds to the key in response to the request associated with the disabling of the key by programming the at least one bit of the OTP memory that has not been previously programmed.

9. The system of claim 8, wherein the programming of the at least one bit that has not been programmed in the plurality of bits of the OTP memory comprises changing a value of the at least one bit that has not been programmed in the plurality of bits of the OTP memory from a first value to a second value by using a fuse of the OTP memory.

10. The system of claim 8, wherein the hash value controller is further to:
determine if the hash value that corresponds to the key is a last hash value stored in the OTP memory that has not been corrupted, and wherein the corrupting of the hash value is further in response to the determination that the hash value that corresponds to the key is not the last hash value stored in the OTP memory that has not been corrupted.

11. The system of claim 8, wherein the hash value controller is further to:
identify an integrity check value associated with the hash value, wherein the corrupting of the hash value is further in response to the integrity check value associated with the hash value.

12. The system of claim 8, wherein the hash value controller is further to:
identify an error correction associated with the memory, wherein the corrupting of the hash value is further in response to the error correction associated with the memory.

13. The system of claim 11, wherein the corrupting of the hash value based on the identified integrity check comprises programming the at least one bit that has not been programmed in a plurality of bits corresponding to the hash value, wherein the hash value with the programmed at least one bit in the plurality of bits fails a condition associated with the integrity check value.

14. A non-transitory computer readable medium including data that, when accessed by a processing device, cause the processing device to perform operations comprising:
receiving a request associated with a revoking of a key;
identifying a hash value corresponding to the key, the hash value being stored in a memory, wherein the hash value comprises a first plurality of bits at a first value and a second plurality of bits at a second value, and wherein the second plurality of bits of the memory have not been previously programmed; and
corrupting the hash value that is stored in the memory based on the request associated with the revoking of the key by changing at least one bit of the second plurality of bits that has not been previously programmed from the second value to the first value.

15. The non-transitory computer readable medium of claim 14, wherein the memory is a one-time programmable (OTP) memory and the changing of the at least one bit of the second plurality of bits from the second value to the first value is performed by using a fuse or an antifuse of the OTP memory.

16. The non-transitory computer readable medium of claim 14, the operations further comprising:
determining if the hash value corresponding to the key is a last hash value stored in the OTP memory that has not been corrupted, and wherein the corrupting of the hash value is further based on the determination that the hash value corresponding to the key is not the last hash value stored in the OTP memory that has not been corrupted.

17. The non-transitory computer readable medium of claim 14, the operations further comprising:
identifying an integrity check value associated with the hash value; and
identifying an error correction associated with the memory,
wherein the changing of the at least one bit of the second plurality of bits from the second value to the first value is based on the integrity check value associated with the hash value and the error correction associated with the memory.

18. The non-transitory computer readable medium of claim 17, wherein the changing of the at least one bit of the second plurality of bits is based on a number of bits to change so that the hash value fails a condition associated with the integrity check value.

19. The non-transitory computer readable medium of claim 17, wherein the changing of the at least one bit of the second plurality of bits is based on a number of bits to change in order to overcome the error correction associated with the memory.

\* \* \* \* \*